United States Patent [19]

Urvoy

[11] Patent Number: 5,307,888

[45] Date of Patent: May 3, 1994

[54] METHOD AND APPARATUS FOR CONTROLLING THE STEERING OF A VEHICLE THAT IS TRACKED OR THAT HAS NON-STEERABLE WHEELS

[75] Inventor: Emile Urvoy, Roussigny, France

[73] Assignee: Giat Industries, Versailles, France

[21] Appl. No.: 978,861

[22] Filed: Nov. 19, 1992

[51] Int. Cl.⁵ .............................................. B62D 11/02
[52] U.S. Cl. ...................................... 180/6.2; 180/6.7
[58] Field of Search ................ 180/6.2, 6.24, 6.26, 180/6.28, 6.3, 6.7; 364/424.05

[56] References Cited

U.S. PATENT DOCUMENTS

| | | | |
|---|---|---|---|
| 4,520,299 | 5/1985 | Konrad . | |
| 4,541,051 | 10/1985 | Jarret et al. | 180/6.28 X |
| 4,761,022 | 8/1988 | Ohashi et al. | 280/703 X |
| 4,837,694 | 6/1989 | Narita et al. | 180/6.48 X |
| 4,914,592 | 4/1990 | Callahan et al. | 180/6.3 X |
| 5,101,919 | 4/1992 | Ossi | 180/6.7 X |

OTHER PUBLICATIONS

Patent Abstracts of Japan, vol. 014, No. 399 (M-1017), Aug. 29, 1990, Japanese Patent Application 2,151,576 to Honda Motor Co., Ltd.

*Primary Examiner*—Margaret A. Focarin
*Assistant Examiner*—Victor E. Johnson
*Attorney, Agent, or Firm*—Bell, Seltzer, Park & Gibson

[57] ABSTRACT

A method and apparatus for controlling the steering of a vehicle that is tracked or that has non-steerable wheels, by applying a steering command signal to a differential control system for controlling the wheels or the tracks of the vehicle, which steering command signal is obtained on the basis of a steering instruction given by an operator or a driver of the vehicle, as modified by a correction effect obtained from a signal representative of the instantaneous angular velocity in yaw of the vehicle as provided by a rate gyro sensor and as amplified by a gain k that varies as a function of the stable or unstable behavior of the vehicle in steering. The invention makes it possible to ensure that the vehicle remains stable while steering by avoiding uncontrolled skids or oversteer.

14 Claims, 3 Drawing Sheets

METHOD AND APPARATUS FOR CONTROLLING THE STEERING OF A VEHICLE THAT IS TRACKED OR THAT HAS NON-STEERABLE WHEELS

The invention relates to a method and to apparatus for controlling the steering of a that is propelled by tracks or by non-steerable wheels.

In general, the invention is equally applicable to a vehicle of the type that is steered by a driver on board the vehicle and to a vehicle of the type that is steered under remote control.

BACKGROUND OF THE INVENTION

Vehicles that have tracks or non-steerable wheels are fitted with means for applying differential control to their tracks or their wheels, thereby enabling them to steer by increasing the speed or the driving torque of the outer track or wheels while braking the inner track or wheels, it being possible to maintain the speed of the vehicle while it is turning by recovering the braking energy from the inner track or wheels. The differential speed of the tracks or the wheels may be directly controlled, either continuously or discontinuously, thereby making it possible to improve control over the steering of the vehicle.

However, such known means do not enable control of the vehicle to be conserved over the entire range of possible turns extending all the way to the beginning of skidding or of oversteer, in particular at high speed. This drawback which puts a limit on the displacement performance of vehicles that are tracked or that have non-steerable wheels, is made worse by the fact that reducing the acceleration of the vehicle or braking the vehicle accentuates its oversteer sharply.

An object of the invention is to increase the ability of a vehicle that is tracked or that has non-steerable wheels to be steered under control, and to improve its stability while steering, in particular when getting close to the beginning of oversteer.

As a corollary, another object of the invention is to increase the displacement performance of a vehicle of this type, and in particular of an armored vehicle for military use.

SUMMARY OF THE INVENTION

To this end, the present invention provides a method of controlling the steering of a vehicle that, has propulsion means selected from either tracks or non-steerable wheels, the vehicle including control means for applying differential control to its tracks or to its wheels, wherein the method consists in producing a steering command signal for application to the above-mentioned control means on the basis of a steering instruction given by an operator or a driver of the vehicle, in detecting the instantaneous angular velocity in yaw of the vehicle, in amplifying with determined gain the signal representative of said detected velocity, in comparing the signal amplified in this way with the steering command signal, and in transmitting the difference between them to the above-mentioned control means in order to ensure that the vehicle is stable while turning by automatically applying a steering correction on detecting the beginning of vehicle oversteer.

The vehicle may be caused to begin to oversteer by instructing it to turn more tightly, or by increasing the speed of the vehicle while it is turning at constant radius, or by a reduction in the grip of the vehicle on the ground, or else by the need to brake while turning.

By measuring the instantaneous angular velocity of the vehicle in yaw and by amplifying said measurement by a gain that is determined in a special manner, it is possible to detect when the vehicle begins to oversteer, and to control oversteer immediately by reducing the steering command as deduced from the instruction given by the driver or the operator, i.e. by automatically applying a steering correction that counters the oversteer.

This gives rise to a very significant increase in the controllable displacement performance of vehicles that are tracked or that have non-steerable wheels, in particular with respect to their maximum speed when travelling in a straight line or when turning.

The method of the invention also consists in causing the gain with which the signal representative of angular velocity in yaw is amplified to vary such that such gain has a value of substantially zero for a range in which the steering behavior of the vehicle is naturally stable, which value increases rapidly on coming close to a range in which the steering behavior of the vehicle is unstable.

In this way, the steering instruction given by the driver or the operator of the vehicle is left substantially unmodified when the vehicle is moving under conditions that enable it to steer in a manner that is naturally stable, whereas said steering instruction is corrected automatically to a greater or lesser extent whenever it tends to take the vehicle into a range of unstable behavior or whenever a sudden drop in the grip of the vehicle on the ground is detected.

In a first implementation of the invention, the method consists in determining the above-mentioned amplification gain applied to the signal representative of angular velocity in yaw on the basis of the ratio of the sideways forces exerted by the ground on the wheels or the track wheels at opposite ends of the vehicle, respectively at the front of the vehicle and at the back of the vehicle.

It has been observed that this ratio has a minimum value in a range of naturally stable steering behavior of the vehicle, and that it increases rapidly up to a maximum value on approaching a range of instability, whatever the cause thereof. It is thus advantageous for the invention to make use of said ratio in calculating the amplification gain to be applied to the instantaneous angular velocity of the vehicle in yaw.

In a variant of the invention, said amplification gain may alternatively be determined on the basis of the sideways linear acceleration of the vehicle, of its angular acceleration in yaw, and of the differential control force on the wheels or the tracks of the vehicle while turning.

These accelerations may be measured directly by means of suitable sensors, or else they may be calculated from the angular velocity in yaw and the forward speed of the vehicle.

The invention also provides apparatus for controlling the steering of a vehicle that has tracks or non-steerable wheels, the vehicle including differential control means for controlling its tracks or its wheels, wherein said apparatus comprises means for generating a steering command signal corresponding to a steering instruction given by an operator or a driver, rate gyro means for detecting the instantaneous angular velocity in yaw of the vehicle and for generating a corresponding signal, means for amplifying said angular velocity in yaw signal by a determined gain, and means for establishing the difference between the steering command signal and the amplified angular velocity in yaw signal, said difference being transmitted to the above-mentioned control means.

The apparatus may include gain generation means for generating a variable amplification gain for application to the angular velocity in yaw signal, said gain having a value of substantially zero for a range in which the steering of the vehicle is naturally stable, and increasing rapidly on approaching a range in which the steering of the vehicle is unstable.

The gain generation means may comprise means for determining the sideways forces exerted by the ground on the wheels or the track wheels at the front and at the back ends of the vehicle, and means for calculating the ratio of said sideways forces.

To determine said sideways forces, it is possible, for example, to use strain gauges fixed on the suspension arms of its wheels or of its track wheels.

In a variant, the gain generator means comprise means for determining the sideways linear acceleration of the vehicle, means for measuring the differential control force on the wheels or the tracks of the vehicle while turning, and means for using the above information to calculate a gain that varies substantially in the same way as the gain obtained from the above-specified ratio of the sideways forces exerted by the ground on the wheels or track wheels at the front and back ends of the vehicle.

In particular, accelerometers may be used for measuring the sideways linear accelerations at the front and at the back of the vehicle.

In a variant, the calculation means enable the gain to be determined on the basis of the angular velocity in yaw, on the forwards speed of the vehicle, and on the controlling force difference on the wheels or on the tracks.

BRIEF DESCRIPTION OF THE DRAWINGS

Embodiments of the invention are described by way of example with reference to the accompanying drawings, in which.

DETAILED DESCRIPTION

Figure 1:
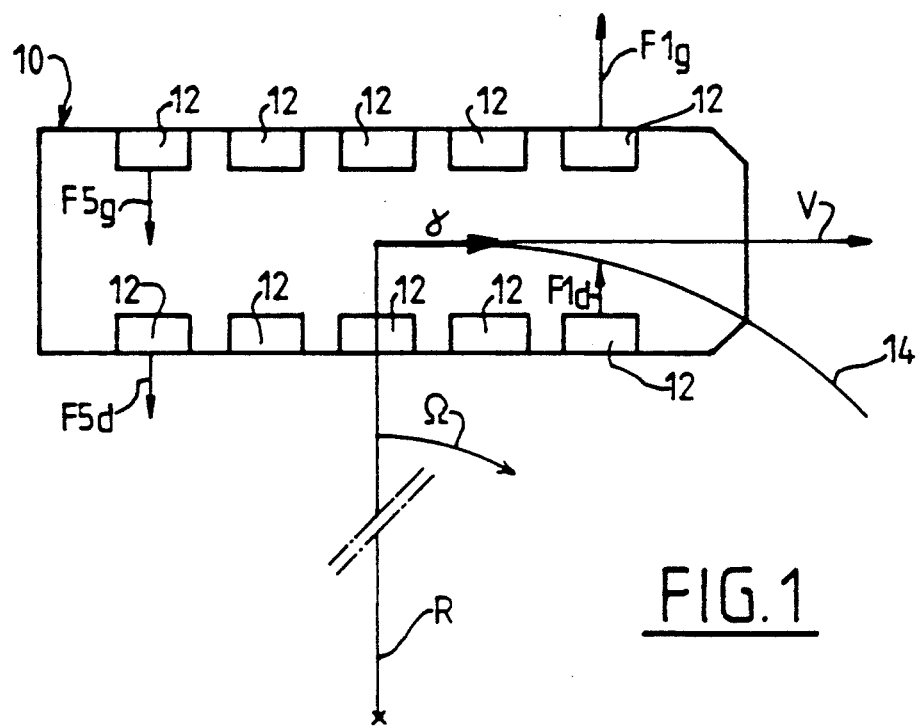
FIG. 1 is a highly diagrammatic plan view of a tracked vehicle while turning right.

FIG. 1 is a highly diagrammatic representation of a tracked vehicle 10 which includes two rows of track wheels 12 in a conventional manner that rest on the bottom lengths of two tracks, which tracks are themselves driven by sprocket wheels. When the vehicle turns to the right to follow a curved trajectory 14 of radius R, the turn is performed by increasing the speed or the driving force on the left track and by braking the right track, with the vehicle then pivoting about a point situated on its longitudinal axis, and the ground exerts sideways forces on the front and back end wheels 12 that are referenced F1g, F1d, F5g, and F5d, respectively in FIG. 1. In this figure, the forwards linear speed of the vehicle is represented by V and its angular velocity along the curve trajectory 14 is represented by $\Omega$.

In general, the behavior of the tracked vehicle while turning depends on variations in its linear speed V, in its angular speed $\Omega$ along its trajectory, and in its coefficient $\mu$ of grip on the ground.

Figure 2:
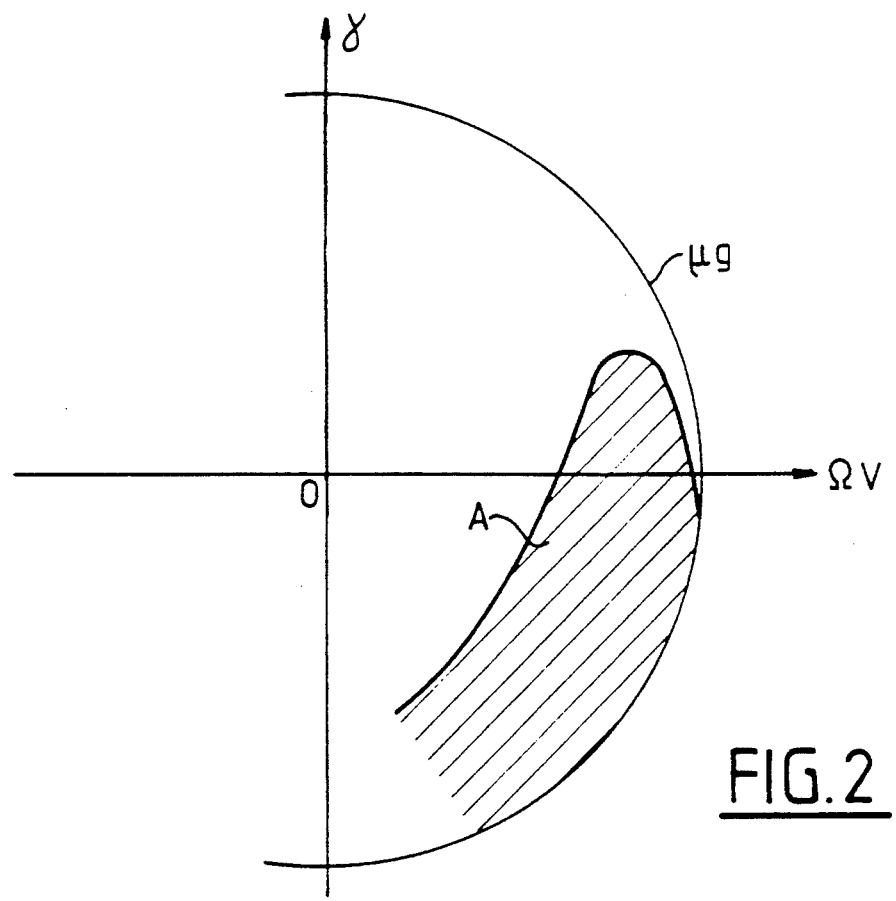
FIG. 2 is a diagram showing ranges of stability and of instability for the vehicle while turning.

FIG. 2 is a diagram showing regions of stable and of unstable steering behavior of the vehicle in a system of orthogonal axes, where the centripetal acceleration $\Omega V$ of the vehicle is plotted along the abscissa and where its linear acceleration $\gamma$ is plotted along the ordinate. The circle of radius $\mu g$ represents the maximum acceleration of the vehicle on the ground, where $\mu$ is the grip coefficient on the ground and g is the acceleration due to gravity. Inside this circle, the shaded area A represents the range in which vehicle steering is unstable. In this range of instability, the vehicle naturally starts to oversteer and it progressively closes up its trajectory. It can be seen from the diagram of FIG. 2 that it is possible to escape from this range of instability by accelerating hard, however, at high speed, there is generally not enough power available for it to be possible to accelerate hard.

It can also be seen from the diagram of FIG. 2 that if the vehicle is braked when it is close to its range of instability, then the operating point of the vehicle is moved into the unstable range and so it begins to oversteer. The same applies if, in the middle of a turn, the grip coefficient of the vehicle on the ground diminishes suddenly.

A particular object of the invention is to provide means for controlling the steering of a vehicle that has propulsion means selected from either tracks or nonsteerable driving wheels which make it possible to cause the vehicle to obey the forward movement and steering commands it receives so long as it remains within its natural stability range as represented by the non-shaded portion inside the circle of FIG. 2, and to change its steering command whenever combining said steering command with the forward movement command would bring the vehicle into its range of (shaded area A).

The invention is essentially based on detecting the beginning of vehicle oversteer and on instantaneously correcting the steering command that causes oversteer to begin.

Figure 3:
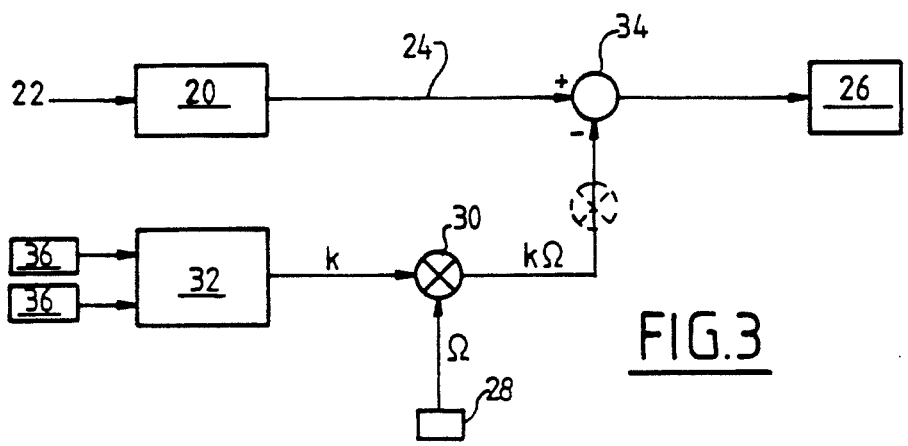
FIG. 3 is a block diagram of apparatus of the invention for controlling the steering of the vehicle.

The control apparatus of the invention (an example of which is shown in FIG. 3) includes means 20 that receive a steering instruction 22 given by the operator or the driver of the vehicle, and that transform it into a steering command signal 24 for application to the differential control means 26 for applying differential control to the right and left tracks of the vehicle, such as a hydrostatic unit for directly controlling the differential speed of the tracks.

The apparatus also includes a rate gyro sensor 28 mounted on the vehicle and producing an output signal $\Omega$ representative of the instantaneous angular velocity in yaw of the vehicle, said signal being applied to one of the inputs of a multiplier 30 whose other input receives a gain or amplification coefficient k produced by calculation means 32. The output from the multiplier 30 is connected to the negative input of a subtractor circuit 34 whose positive input receives the steering command signal 24 and whose output is connected to the input of the differential control means 26 of the tracks. As shown in dashed lines, a level-offset amplifier may optionally be interposed between the output of the multiplier 30 and the negative input of the subtractor 34.

Advantageously, the amplification gain k applied to the instantaneous angular velocity in yaw of the vehicle is variable as a function of the conditions under which the vehicle is moving, said gain having a value that is substantially zero when the vehicle is in its stable steering range, and increasing rapidly up to a predetermined maximum value on approaching the range in which vehicle steering is unstable.

In a first embodiment of the invention, the gain k is obtained from the sideways forces exerted by the ground on the front and back end track wheels of the vehicle.

This ratio is equal to $(F1g+F1d)/(F5g+F5d)$, using the notation of FIG. 1. This ratio is written as $F1/F5$ below since it varies substantially as $F1g/F5d$ when the vehicle is turning right, with F1d and F5g tending to be small or zero under such circumstances, and conversely, when the vehicle is turning left, the ratio varies with $F1d/F5g$.

Figure 4:
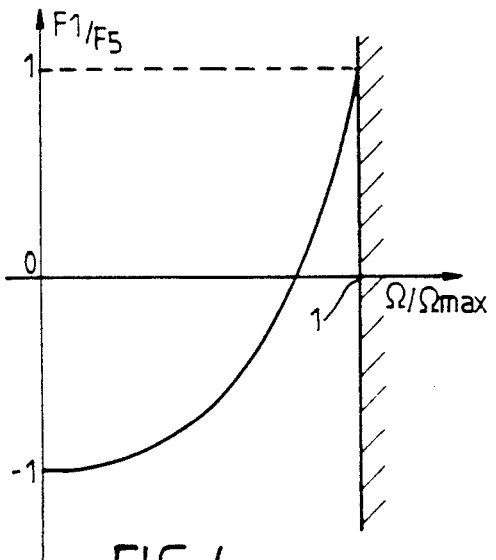
FIG. 4 is a graph showing the variation in the ratio of the sideways forces exerted by the ground on the front and back end track wheels of the vehicle.

The way this ratio $F1/F5$ varies as a function of the ratio $\Omega/\Omega max$ (ratio of the instantaneous angular velocity in yaw of the vehicle to the maximum possible value of said angular velocity) is shown in FIG. 4. It can be seen that the ratio $F1/F5$ is approximately equal to $-1$ when the vehicle in a straight line, that it passes through a value of zero when the angular velocity in yaw of the vehicle is equal to about 80% of its maximum value, and that it tends towards 1 in the vicinity of the maximum value of the angular velocity in yaw of the vehicle.

The gain k with which the instantaneous angular velocity in yaw of the vehicle is amplified is given by the equation $k=a+F1/F5$, where a is a constant having a value close to 1 (i.e. varies between about 0 and about 2), which constant increases slowly from zero in the range of stable vehicle steering (small $\Omega$) and which then increases very quickly on approaching the range of unstable steering (large $\Omega$).

Figure 5:
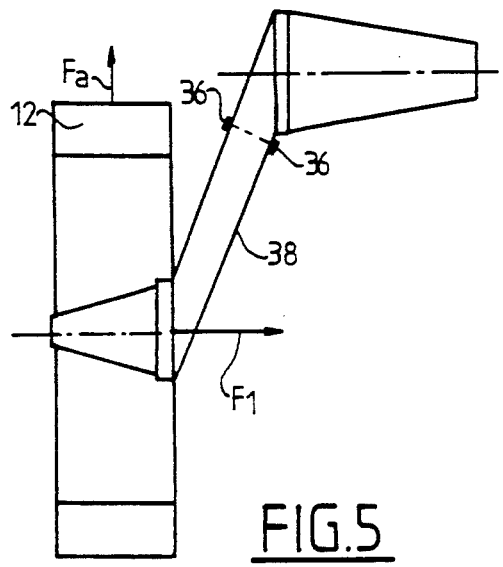
FIG. 5 is a diagram of a suspension arm for a track wheel of the vehicle.

As shown diagrammatically in FIG. 5, the sideways forces exerted by the ground on each end track wheel of the vehicle can be determined by means of strain gauges 36 fixed on the suspension arm 38 of the track wheel 12, the strain gauges 36 serving to measure the bending force to which the suspension arm 38 is subjected and making it possible by calculating moments to deduce therefrom the sideways force (e.g. F1) exerted by the ground on the wheel 12, assuming that the force Fa exerted on the track wheels by the tension in the track is known.

The apparatus described with reference to FIGS. 3 to 5 thus operates as follows:

The strain gauges 36 mounted on the suspension arms 38 of the front and back end track wheels of the vehicle provide the calculation means 32 with information enabling it to calculate the ratio of the sideways forces exerted by the ground on the front and back end track wheels of the vehicle, and enable it to deduce therefrom the amplification gain k to be applied to the instantaneous angular velocity in yaw of the vehicle, which instantaneous velocity is provided by the gyro sensor 28. The output signal $k\Omega$ from the multiplier 30, optionally after having its level offset, is subtracted from the steering command signal 24 provided by the means 20 in response to a steering instruction 22 given by the driver of the vehicle. The difference between the steering command signal 24 and the signal $k\Omega$ is applied to the differential control means 26 for the tracks, for the purpose of controlling vehicle steering.

When the conditions under which the vehicle is moving are such that it lies in its range of naturally stable steering, then the amplification gain k has a value that is substantially zero or that is close to zero, and the negative effect of the instantaneous angular velocity in yaw on the steering command signal 24 is negligible, so that the steering command signal is applied substantially unchanged to the control means 26. The vehicle then turns in compliance with the steering instruction given by its driver.

In contrast, if the conditions are such that the vehicle is coming close to its range of unstable behavior in steering, then the value of the amplification gain k is 1 or greater than 1, and the steering command signal 24 is diminished by the negative effect of the instantaneous angular velocity in yaw of the vehicle, thereby automatically correcting the steering of the vehicle, and preventing it from beginning to oversteer, while maintaining it substantially on the trajectory that corresponds to the steering instruction given by the operator or the driver of the vehicle.

Figure 6:
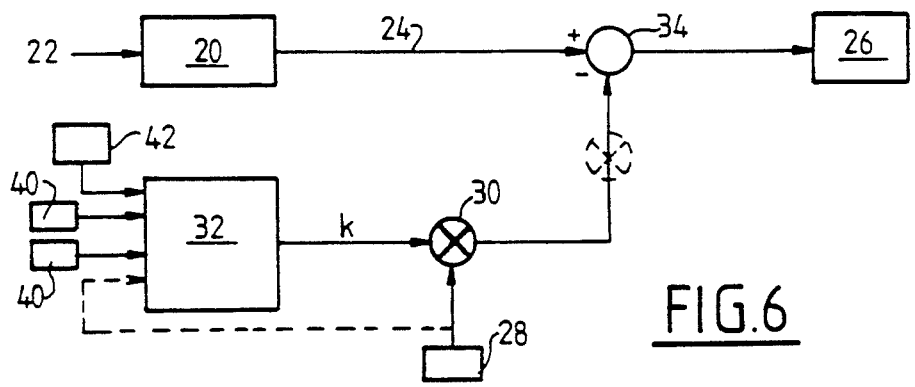
FIGS. 6 and 7 are block diagrams showing variant apparatuses of the invention.

FIG. 6 shows a variant embodiment of the invention in which the amplification gain applied to the angular velocity in yaw of the vehicle is no longer obtained from the sideways forces exerted by the ground on the front and back end track wheels of the vehicle, but on the basis of the sideways accelerations at the front and the back of the vehicle, on the basis of the angular acceleration in yaw of the vehicle, and on the basis of the differential force applied to the tracks during steering.

The apparatus then includes two linear accelerometers 40 mounted at the front and at the back of the vehicle to determine the sideways accelerations thereat. Means 42 are also provided for measuring the differential force applied to the tracks in steering, said differential force being the result of the differential speed control applied to the tracks and being obtained, for example, on the basis of a pressure difference when the control means 26 are of the hydraulic type.

The output signals from the accelerometers 40 and from the means 42 for measuring the differential force are applied to the inputs of the calculation means 32 which provide an output comprising the amplification gain k to be applied to the instantaneous angular velocity in yaw of the vehicle as delivered by the gyro sensor 28. The remainder of the apparatus is identical to that shown in FIG. 3.

The difference in sideways acceleration as measured by the front and back sensors of the vehicle makes it possible to determine the angular acceleration in yaw of the vehicle by dividing said difference by the length of the vehicle.

The mean of these two sideways accelerations provides the sideways linear acceleration of the center of gravity of the vehicle.

The following equations are used in determining the amplification gain k to be applied to the instantaneous angular velocity in yaw of the vehicle:

$$\dot{\Omega} = (\ddot{y}1 - \ddot{y}5)/L$$

$$\ddot{y} = (\ddot{y}1 + \ddot{y}5)/2$$

$$k = a + (M\ddot{y}2d + \dot{\Omega}I - \Delta F.D/2)/(M\ddot{y}2d - \dot{\Omega}I + \Delta F.D/2)$$

where:

$\ddot{y}1$ = sideways linear acceleration at the front of the vehicle $\ddot{y}5$ = sideways linear acceleration at the back of the vehicle L = vehicle length $\dot{\Omega}$ = angular acceleration in yaw $\ddot{y}$ = sideways linear acceleration of the center of gravity of the vehicle M = mass of the vehicle d = distance between the axes of two consecutive track wheels I = angular inertia of the vehicle in yaw $\Delta F$ = differential force applied to the tracks D = distance between the axes of the tracks a = constant.

This gain varies substantially in the same way as that obtained from the ratio F1/F5 in the first embodiment of the invention.

In a variant, an angular accelerometer may be used to measure the angular acceleration in yaw of the vehicle. It is then possible to use a single linear accelerometer to measure the sideways linear acceleration of the center of gravity of the vehicle.

In another variant embodiment of the invention, it is also possible for the amplification gain k to be calculated on the basis of the angular velocity in yaw of the vehicle as provided by the gyro sensor 28, of the forwards speed of the vehicle, and of the differential force applied to the tracks. Under such circumstances, the signal representative of the angular velocity in yaw of the vehicle is applied to one of the inputs of calculation means 32 as shown in dashed lines in FIG. 6, another input of said calculation means receiving a signal representative of the forwards speed of the vehicle. The derivative of the signal representative of angular speed in yaw serves to obtain the angular acceleration in yaw of the vehicle, and lowpass filtering of the product of the angular speed in yaw of the vehicle multiplied by the forwards speed of the vehicle serves to obtain the sideways linear acceleration of the center of gravity of the vehicle. This thus reduces to the preceding case with the amplification gain k being given by the same equation as a function of the sideways acceleration of the center of gravity of the vehicle, of its angular acceleration in yaw, and of the differential control force applied to its tracks. This variant avoids installing linear and/or angular accelerometers on the vehicle.

Figure 7:
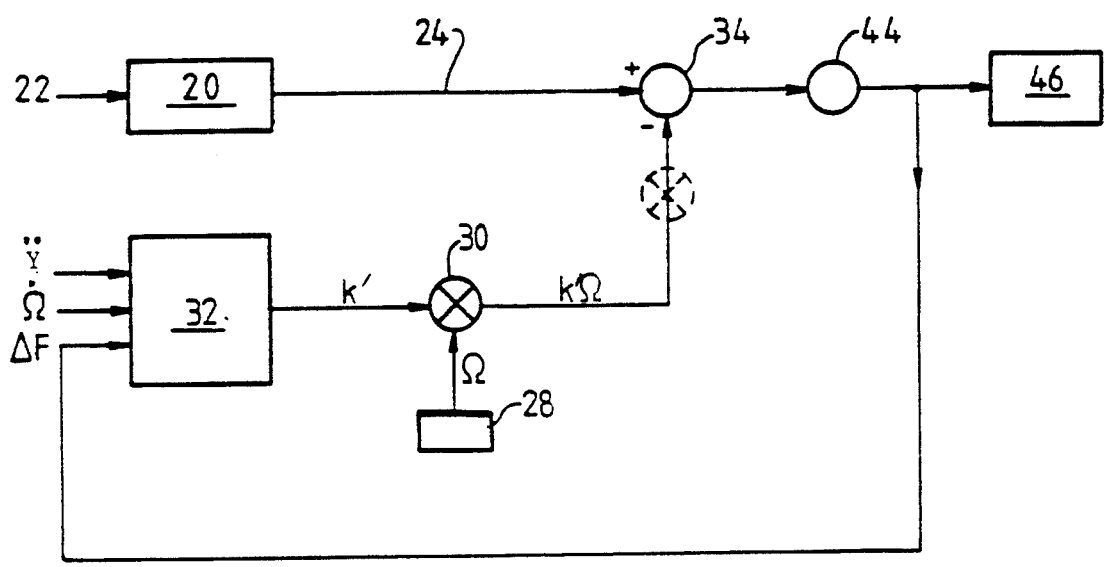

FIG. 7 is a diagram showing apparatus of the invention for a tracked vehicle fitted with a steering control system based on controlling the force differential applied to the tracks, e.g. by means of a steering brake which, when applied, serves to adjust the differential torque of the tracks.

This apparatus of the invention is essentially similar to that shown in FIG. 6, with the calculation means 32 receiving a signal $\ddot{y}$ representative of the sideways linear acceleration of the vehicle, a signal $\dot{\Omega}$ representative of the angular acceleration in yaw, and a signal $\Delta F$ representative of the differential control force applied to the tracks. On the basis of said signal, the calculation means 32 generate an amplification gain k' for application to the instantaneous angular velocity in yaw as provided by the gyro sensor 28. The steering command signal 24 and the output signal k'$\Omega$ from the multiplier 30 are applied to the inputs of a subtractor 34 which transmits the difference between them to means 44 for transforming said difference (which corresponds to an angular velocity) into a differential force signal $\Delta F$ which is applied to the steering control system 46.

As shown in FIG. 7, said differential force signal $\Delta F$ may also be applied to the input of the calculation means 32 for the purpose of determining the gain k'.

The gain k' is calculated using the equation given for the embodiment of FIG. 6, but using a constant a' which is greater than a in order to reinforce the correcting effect of the angular velocity in yaw as applied to the steering command signal, since a vehicle whose steering is controlled by controlling the force differential applied to the tracks encounters unstable behavior as soon as it leaves the range in which the steering torque increases while a turn becomes tighter.

The invention is described above in the context of a tracked vehicle, however it also applies to wheeled vehicles in which the wheels are not steerable.

I claim:

1. A method of controlling the steering of a vehicle that has propulsion means selected from either tracks or non-steerable driving wheels, and differential control means for applying differential control to the propulsion means, the method comprising the steps of producing a steering command signal for application to the control means on the basis of a steering instruction given by an operator of the vehicle, detecting an instantaneous angular velocity in yaw of the vehicle, amplifying with a determined gain a signal representative of the said velocity, said gain being variable and having a value of substantially zero when the steering behavior of the vehicle is naturally stable, which value increases rapidly when the steering behavior of the vehicle becomes unstable, comparing the amplified signal with the steering command signal for obtaining a difference, and transmitting the difference to the control means in order to automatically apply a steering correction on detecting a beginning of vehicle oversteer.

2. A method according to claim 1, comprising determining the gain applied to the signal representative of said angular velocity in yaw o the basis of a ratio of the sideways forces exerted by the ground on the propulsion means at a front end of the vehicle and at a back end of the vehicle.

3. A method according to claim 2, comprising determining the sideways forces by measuring bending forces in suspension arms for the propulsion means at the front and back ends of the vehicle.

4. A method according to claim 1, comprising determining the gain on a basis of a sideways linear acceleration of the vehicle, of an angular acceleration in yaw, and of a force differential for controlling the propulsion means of the vehicle while steering.

5. A method according to claim 4, comprising measuring the lateral linear accelerations at a front end and at a back end of the vehicle, and deducing therefrom by calculation a sideways linear acceleration of a center of gravity of the vehicle, and the angular acceleration in yaw of the vehicle.

6. A method according to claim 4, comprising determining and measuring the sideways linear acceleration of the center of gravity of the vehicle and the angular acceleration in yaw of the vehicle.

7. A method according to claim 1, wherein said step of detecting a instantaneous angular velocity in yaw of the vehicle is performed by means of a rate gyro sensor.

8. Apparatus for controlling the steering of a vehicle that has propulsion means selected from either tracks or non-steerable driving wheels and differential control means for controlling the propulsion means, said apparatus comprising means for generating a steering command signal corresponding to a steering instruction given by an operator, rate gyro means for detecting the instantaneous angular velocity in yaw of the vehicle and for generating a corresponding velocity signal, gain generation means for amplifying said velocity signal by a variable gain, said gain having a value of substantially zero when the steering of the vehicle is naturally stable, and increasing rapidly when the steering of the vehicle is unstable, and means for establishing a difference between the steering command signal and the amplified velocity signal, said difference being transmitted to the above-mentioned control means, in order to automatically apply a steering correction on detecting a beginning of vehicle oversteer.

9. Apparatus according to claim 8, wherein the gain generation means comprise means for determining sideways forces exerted by the ground on the propulsion means at a front and at a back end of the vehicle, and means for calculating a ratio of said sideways forces.

10. Apparatus according to claim 9, wherein the means for determined said sideways forces comprise strain gauges fixed to suspension arms for the propulsion means.

11. Apparatus according to claim 8, wherein the gain generation means comprise means for determining a sideways linear acceleration of the vehicle and an angular acceleration in yaw, means for measuring a differential control force applied to the propulsion means of the vehicle while steering, and means to calculate an amplification gain on the basis of the sideways linear acceleration, of the angular acceleration in yaw, and of the differential control force applied to the propulsion means.

12. Apparatus according to claim 11, including at least one accelerometer for measuring said sideways linear acceleration of the vehicle.

13. Apparatus according to claim 11, including an accelerometer for measuring the angular acceleration in yaw of the vehicle.

14. Apparatus according to claim 11, wherein the calculation means are designed to determine said sideways linear acceleration of the vehicle and the angular acceleration in yaw on the basis of the angular velocity in yaw and of a forward speed.

* * * * *

UNITED STATES PATENT AND TRADEMARK OFFICE
CERTIFICATE OF CORRECTION

PATENT NO. : 5,307,888
DATED : May 3, 1994
INVENTOR(S) : Urvoy

It is certified that error appears in the above-identified patent and that said Letters Patent is hereby corrected as shown below:

Column 1, line 8, after "a" insert -- vehicle --.

Column 1, line 49, after "that" delete ",".

Column 1, line 50, after "or" insert -- by --.

Column 4, line 44, after "of" insert -- instability --.

Column 5, line 29, after "vehicle" insert -- is moving --.

Column 8, line 41, "o" should be -- on --.

Column 8, lines 60-61, "determining" should be -- detecting --.

Column 9, line 24, "determined" should be -- determining --.

Signed and Sealed this

Thirtieth Day of August, 1994

Attest:

BRUCE LEHMAN

*Attesting Officer*  *Commissioner of Patents and Trademarks*